United States Patent [19]
Feinman et al.

[11] 3,783,442
[45] Jan. 1, 1974

[54] DEPTH SOUNDER

[75] Inventors: George Feinman, Whitestone, N.Y.;
Richard Haven, Long Branch, N.J.

[73] Assignee: Andrea Radio Corporation, Long Island City, N.Y.

[22] Filed: Apr. 10, 1972

[21] Appl. No.: 242,421

[52] U.S. Cl. ............................................. 340/3 R
[51] Int. Cl. ............................................. G01s 9/68
[58] Field of Search .................................. 340/3 R

[56] References Cited
UNITED STATES PATENTS
3,564,490 2/1971 Camp .................................. 340/3 R
3,061,812 10/1962 Rachwalski ........................ 340/3 R

*Primary Examiner*—Richard A. Farley
*Attorney*—Harvey W. Mortimer et al.

[57] ABSTRACT

A depth sounding instrument including an oscillator for supplying AC energy to a transducer. The oscillator is keyed on by a multivibrator which produces clock pulses. Each clock pulses switches the state of a flip flop and starts a time measuring interval each time a clock pulse is supplied to the oscillator. A receiver receives the reflected sonic energy and terminates the time measuring interval of the flip-flop. A meter responds to the measured time interval to provide a visual indication of the depth from which energy was reflected.

13 Claims, 1 Drawing Figure

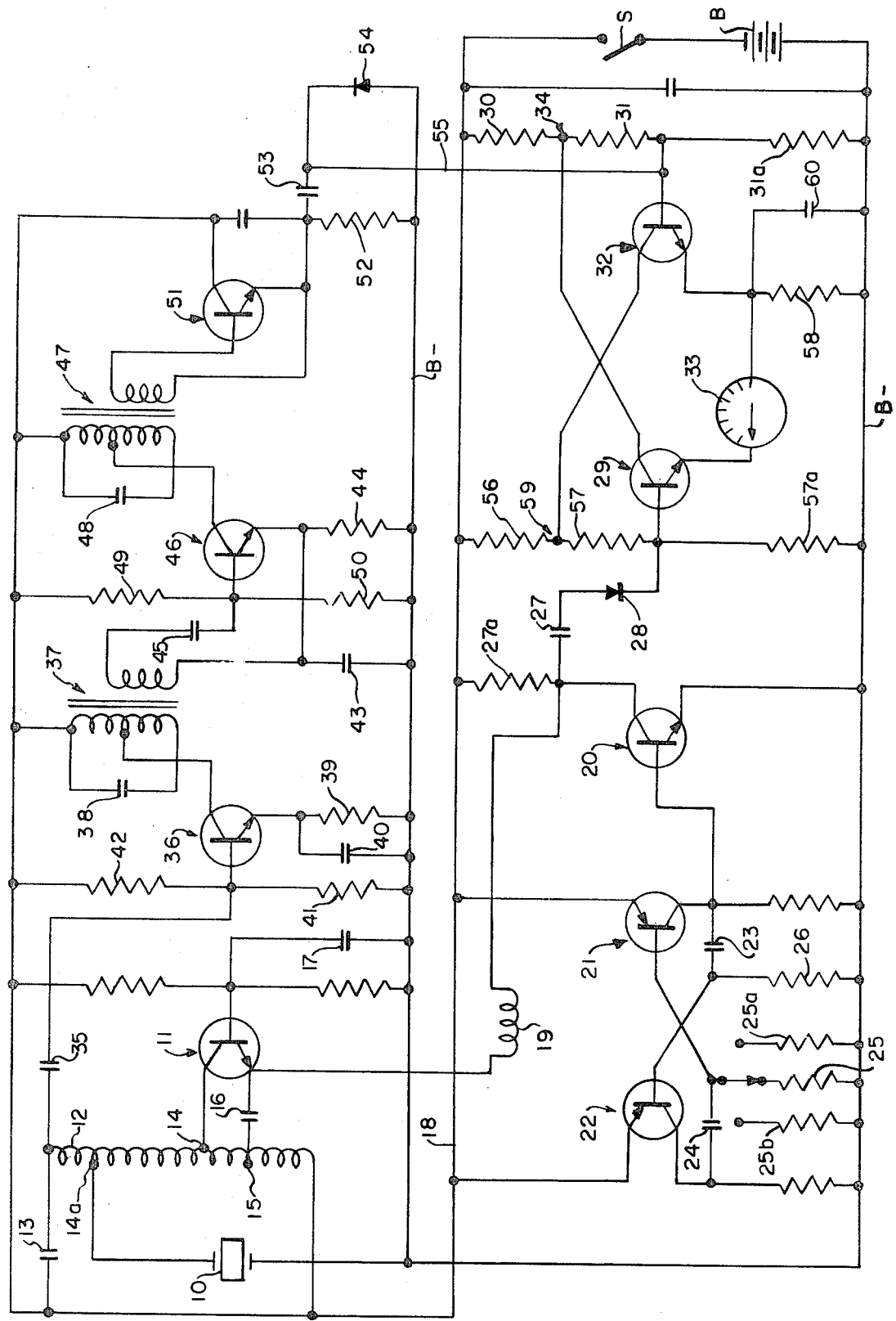

DEPTH SOUNDER

The present invention relates to depth sounding instruments and more particularly to an instrument of relatively low cost which produces accurate measurements of the depth of a body of water or an object which is sound opaque.

Depth sounder instruments have found increasing use in recent years by boating enthusiasts. One circuit for a depth sounder is described in U.S. Pat. No. 3,061,812. In that patent an RC type discharge circuit keys an oscillator to produce a transmitter pulse. This pulse is appled to an amplifier having a high level and a low level output. The pulse from the high level output is supplied to the transducer while the pulse from the low level output triggers a circuit to start a time measuring interval which is terminated by the reception of the pulse reflected from the target.

The present invention relates to a depth sounder circuit which has several advantages over that of the prior art. More particularly, the depth sounder of the present invention utilizes an oscillator which provides AC energy to a transducer for conversion into sonic energy and transmission into the body of water. An asymmetric multivibrator supplies clock pulse signals for keying on the oscillator to provide the energy to the transducer. The keying of the oscillator also sets a flip-flop, used as a time measuring circuit, into a first stable state to start the time measuring interval. The sonic energy reflected from the target to the transducer is converted into an electrical signal and the electrical signal is amplified by a receiver which contains circuits for limiting the transmitted pulse of energy and also for preventing the transmitted pulse from effecting the state of the flip-flop. The amplified version of the reflected signal sets the flip-flop circuit into a second stable state to terminate the time measuring interval.

In accordance wijh the invention, the flip-flop circuit operates a meter which measures current flowing during the time measuring interval. The meter is calibrated in feet, or other similar units, to give an indication of the depth from which the sonic energy was reflected. The multivibrator which provided the clock pulses for keying the oscillator also preferably includes a switching arrangement for selecting values of its components so as to change the repetition rate of the multivibrator clock pulses. This makes the instrument capable of measuring depth at several different ranges with a relatively simple change in its circuit. The use of the clock arrangement keying an oscillator off and on provides for a constant power output at all times, thereby giving the instrument a constant sensitivity at all measuring ranges.

The instrument of the subject invention is relatively simple and yet considerably accurate for its cost.

It is therefore an object of the present invention to provide a depth sounder instrument using a multivibrator clock circuit to key an oscillator off and on.

A further object is to provide a depth sounder instrument in which a multivibrator produces clock pulses to key an oscillator on and off to provide energy to a transducer and in which the clock pulses also start a time measuring interval which is terminated upon the receipt of the reflected energy.

Still a further object of the invention is to provide a depth sounder utilizing an oscillator which is keyed by a multivibrator, each keying pulse starting a time measuring interval by setting the state of a flip-flop circuit to a first stable state, the time measuring interval being terminated by the receipt of the reflected pulse which further sets the state of the flip-flop circuit to a second stable state.

Other objects and advantages of the present invention will become more apparent upon reference to the following specification and annexed drawings, in which the single FIGURE is a schematic diagram of the instrument according to the present invention.

Referring to the drawing the transmitter portion of the circuit includes a transducer 10 which converts electrical energy supplied by an oscillator 11 into sonic energy which is transmitted to the water. The transducer 10 also receives reflected sonic energy from a sound opaque object or the bottom of the body of water being measured and converts it into electrical energy which is utilized to provide an indication of the depth from which the sonic energy was reflected. Transducer 10 can be of any conventional type, for example, a piezoelectric or magnetostrictive member.

The oscillator 11 shown is of the Hartley type. A free-running, clock type multivibrator formed by a pair of transistors 21 and 22 generates precisely time pulses at a predetermined repetition rate to key on oscillator 11 and supply the electrical signal to transducer 10.

The collector electrode of the oscillator transistor 11 is connected to a tap 14 on a coil 12 which forms part of a parallel tuned resonant circuit with a capacitor 13. The resonant circuit determines the frequency of oscillation of the circuit. One end of transducer 10 is connected to a tap 14a on coil 12 and the other end to B−, The emitter of transistor 11 is connected by a capacitor 16 to a second tap 15 on coil 12. Capacitor 16 provides the feedback path for the oscillator circuit.

The collector of transistor 11 is positively biased from a suitable source of potential 18, such as a battery B. Of course, an AC voltage source can be used if suitable rectifying circuits are provided. The collector is connected to the battery B through a single pole-single throw switch S, to the lower end of coil 12 and then the tap 14. With proper base to emitter bias transistor 11 will oscillate at a given frequency determined by its components with a high degree of stability. To achieve oscillation in the circuit shown, the emitter of transistor 11 has to be placed at or near B−potential to set up the proper bias condition. The emitter electrode has a path to B− through an RF choke 19 and the collector and emitter of a switching transistor 20 which acts as a single pole, single throw switch. The base of transistor 20 is connected to the collector of a transistor 21 which is connected with a second transistor 22 to form an asymmetrical free-running multivibrator. The multivibrator provides clock pulses at a highly stable rate to key on oscillator 11.

As shown, transistors 21 and 22 are of the PNP type and their emitters are connected directly to B+ on line 18. Cross-coupling from the base of transistor 21 to the collector of transistor 22 is provided by a capacitor 24 and coupling from the base of transistor 22 to the collector of transistor 21 by the capacitor 23. Resistors 25 and 26 are connected respectively from the base electrodes of transistors 21 and 22 to B− to complete the timing circuit for the multibibrator.

When DC voltage is suppled to the two transistors 21 and 22 from the B+ line 18, one of the transistors 21 or 22 will conduct instantaneously putting the other transistor in a non-conducting state. Assuming transistor 21 conducts, the instantaneous voltage change produced across capacitor 23 supplies a signal to the base of transistor 22 to make it non-conducting. Capacitor 23 discharges through resistor 26 until the DC potential on the base of transistor 22 reaches a level suitable to enable transistor 22 to conduct. At this time, transistor 22 instantaneously conducts to change the voltage across capacitor 24 to apply a signal to the base of transistor 21 to make it non-conductive. The voltage across the capacitor 24 discharges through resistor 25 changing the potential on the base of transistor 21 until a level is reached to render it conductive. Thus, the two transistors 21 and 22 alternately go conductive and non-conductive to form a free-running multivibrator. The values of capacitor 24 and resistor 25 and capacitor 23 and resistor 26 are respectively chosen to make the multivibrator asymmetric in its timing, the frequency of conduction and non-conduction being proportional to the ratio of the time constant of capacitor 23 and resistor 26 to that of capacitor 24 and resistor 25.

The collector of transistor 21 is connected to the base of switching transistor 20. When transistor 21 conducts, the voltage at its collector rises. This voltage is applied to base of NPN transistor 20 and causes it to conduct for the same period of time that transistor 21 conducts. When switching transistor 20 conducts, the voltage at its collector drops from the B+ potential to a lower value, close to B—. This places the voltage on the emitter of the oscillator transistor 11 substantially at B— causing the transistor to oscillate and produce an AC signal which is applied to transducer 10 for conversion into sonic energy.

As described, oscillator transistor 11 produces an AC signal of a frequency determined by the tank circuit 12 and 13. The time of conduction of oscillator transistor 11 is determined by the conduction time of clock transistor 21 which supplies the keying pulse. Transistor 21 has a conduction time which is determined by the values of capacitors 23, 24 and resistors 25, 26. These resistances and capacitances also control the off time between successive periods of conduction of transistor 21. By selecting the values for these resistances and capacitances, for example by providing a switch which can select from a group of different values for one or more of these components, the repetition rate or the time duration of the sonic energy pulses produced by transducer 10 can be controlled.

As shown, a switch 25 is provided to selectively connect one of a number of resistors 25a, 25, 25b into the multivibrator circuit. Each of these resistors has a different value to change the repetition rate of the clock pulses and, in turn, of the transmitted pulse of sonic energy. By selecting the appropriate resistor 25, 25a or 25b, the depth sounding range of the instrument can be changed. For example, when attempting to measure at the maximum range of the instrument, the lowest repetition rate should be used to permit sufficient time for one pulse of sonic energy to be transmitted to and received from the object after reflection, without interfering with the next pulse of energy transmitted.

In the circuit described, a change in the repetition rate of the sonic energy pulses does not affect the output power of oscillator 11. That is, oscillator 11 operates to supply the same output level signal at all times to the transducer since the keying pulse level is not changed at different repetition rates. This is an advantage since the receiver portion of the circuit does not have to have variable sensitivity.

Simultaneously with the transmission of a pulse of sonic energy, which occurs when clock transistor 21 becomes conductive, a pulse from the collector of switching transistor 20 is supplied through a capacitor 27 and a diode 28. When transistor 20 conducts, which is at the same time transistor 21 keys on oscillator 11, the voltage at its collector drops. Capacitor 27 and the resistor 27a connected between the collector of transistor 20 and B+ line 18 differentiate the switching pulse at the collector of transistor 20. The leading edge of the switching pulse is a positive going pulse which is passed by diode 28 to the base of a transistor 29 biasing it into conduction to start the time-measuring interval.

Transistor 29 forms one section of a bistable flip-flop circuit. The collector of transistor 29 is connected to the junction 34 of a voltage divider formed by resistors 30, 31 and 31a to receive positive bias. The base of the second transistor 32 of the flip-flop is connected to the lower end of divider resistor 31. The collector of transistor 32 is connected to the jucntion 59 of a second voltage divider formed by resistors 56, 57, and 57a to receive positive bias. The base of transistor 29 is biased from the lower end of resistor 57. The emitter of transistor 29 is connected to one terminal of a meter 33 and the emitter of transistor 32 is connected to the meter's other terminal. The emitter of transistor 32 is also returned to B— by a parallel connected resistor 58 and capacitor 60 which forms an RC type biasing circuit. Meter 33 is a conventional meter of suitable range for measuring current. The scale of the meter is suitably calibrated in feet or other distance unit.

Transistor 29 is keyed into conduction to start the time measuring interval by the switching transistor 20 being turned on. Current now flows from the collector to emitter path of transistor 29. This lowers the DC potential at junction point 34 of voltage divider 30, 31, 31a which in turn drops the voltage at the base of transistor 32 holding it non-conducting and preparing it for a signal from the receiver section of the instrument. The receipt of this signal will change the states of the two flip-flop transistors 29 and 32 and terminate the time measuring interval.

The receiver section of the instrument includes several amplifier stages which are tuned to the frequency of the signals produced by oscillator 11. Considering the operation of the receiver section, sonic energy reflected from a sound opaque body is picked up by transducer 10 and converted into an electrical signal which appears at the tap 14a of coil 12. This signal passes through a capacitor 35 to the base of a first transistor amplifier 36. Amplifier 36 is a tuned amplifier and has a parallel resonant tank circuit 37 and 38 in its collector circuit tuned to the same frequency as the signal produced by oscillator 11.

The emitter of amplifier transistor 36 is returned to B— through an RC bias circuit formed by a parallel connected resistor 39 and capacitor 40. The base of transistor 36 is connected to receive bias from the junction of voltage divider resistors 41 and 42 which are connected between B— and B+. Transistor 36 functions as a high-grain amplifier to a small amplitude input signal at the proper frequency, the frequency of oscillator 11. When a high amplitude signal is present at the base of transistor 36, such as the pulse of AC voltage supplied to the transducer by oscillator 11, the transistor 36 saturates. This raises the potential at the emitter of transistor 36 by instantaneously charging capacitor 40. This reduces the current flowing through transistor 36. In effect, transistor 36 operates as a limiter. The limiting operation of the transistor 36 is controlled by the time constant of the resistor 39 and capacitor 40 for a period sufficient to cover the pulse width of the signal supplied by oscillator 11 to transducer 10.

The amplified output signal from amplifier 36 appears across the primary of tuned transformer 37 and is applied by the transformer secondary through a capacitor 45 to a second tuned transistor amplifier 46. The base of transistor 46 is supplied bias through a connection to the junction of a voltage divider formed by resistors 49 and 50. A parallel tuned tank circuit, transformer 47 and capacitor 48, is connected to the collector. This circuit tunes the amplifier 46 to the frequency of the signal produced by oscillator 11. The emitter has an RC bias circuit formed by a capacitor 43 and a resistor 44. These two components perform the same limiting function described previously for resistor 39 and capacitor 40.

The output signal from the second stage amplifier 46, appearing across the primary of transformer 47 is an amplified version of the signal reflected from the target. This signal is coupled from the upper end of the transformer 47 secondary to the base of a transistor 51. The lower end of the transformer secondary is connected to the emitter of the same transistor. Transistor 51 operates as a pulse detector at the resonant frequency of the amplified reflected signal and produces at its emitter only the pulse envelope. Because of the connection of the two ends of the secondary of transformer 47, the AC component of the pulse envelope appearing at the transistor's base and emitter simultaneously cancel out and only the pulse envelope appears at the transistor emitter.

The detected pulse envelope is differentiated by a resistor 52 connected between the emitter of transistor 51 and B− and a capacitor 53 to produce a waveform having a sharp positive going leading edge and a sharp negative going trailing edge. The negative going trailing edge of the detected pulse envelope passes through a diode 54 to B− while the positive going leading edge is supplied to the base of the transistor 32 over line 55. As previously described, transistor 32 is the second transistor of a flip-flop circuit which was preconditioned to a non-conducting state at the beginning of the transmission of the pulse of sonic energy when switching transistor 20 is turned on.

The positive going signal on line 55 is of sufficient amplitude to make transistor 32 conductive. This lowers the DC potential at the junction 59 of voltage divider 56, 57, 57a, making transistor 29 non-conductive. Until transistor 32 is made conductive, current flows through the meter 33. When transistor 32 conducts the current flow through meter 33 ceases and transistor 29 is conditioned to be turned on again in response to the next switching pulse from transistor 20.

The measurement of distance occurs as follows. The leading edge of the clock pulse causes a keying signal to be applied to the base of transistor 29 to set the flip-flop in its first stable state and start current flowing through meter 33. At this time transistor 32 is non-conducting. The received reflected signal is detected and the leading edge applied to the base of transistor 32, makes transistor 32 conductive and transistor 29 non-conductive, setting the flip-flop to its second stable state. This terminates the current flow through meter 33 ending the measured time interval. Meter 33, is connected between the emitter element of transistor 29 and B−. Therefore, whenever transistor 29 conducts, current flows through the meter. The periods of conduction of transistor 29 are relatively shorter than the inherent time constant of the meter. The meter therefore averages the current flow through transistor 29, and such current flow is directly proportional to the period of conduction of transistor 29. The current flowing through meter 33 is therefore proportional to the time interval between the transmission of the sonic pulse and reception of the reflected sonic pulse. When the meter is properly calibrated in distance, it will directly read the distance from the transducer to the respective target.

As described, switching transistor 20 simultaneously keys the transmitter and the meter circuit. Since there is a slight inherent time delay through he receiver circuit that is not realized by the keying pulse, the transistor 29 of the flip-flop 29, 32 is assured a first stable state with conduction of transistor 29 and non-conduction of transistor 32. The RC bias circuit of resistor 58 and capacitor 60 in the emitter of transistor 32 insures that the flip-flop 29, 32 does not revert to its second stable state by the impression of the delayed transmitted pulse. The DC potential level at the emitter of transistor 32 is raised by conduction of current through transistor 29. This level is sufficiently high to prevent the transmitted pulse appearing at the base of transistor 32 from switching transistor 32 into conduction. This level is maintained for a time determined by the time constant values of capacitor 60 and resistor 58. After a time sufficient for the transmitted pulse to be of no further effect, the charge on capacitor 60 leaks off through resistor 58 and reduces the potential on the emitter of transistor 32 to a proper level conditioning transistor 32 for reception of the reflected sonic energy pulse amplified by the receiver so that the state of the flip-flop can be switched to terminate the time measuring interval.

The instrument can be used to detect a number of different distance ranges with slight adjustment of a single component value. For example, to measure distances of zero to 150 feet and indicate the same over the full scale of meter 33, the oscillator circuit may be designed for a frequency of 195 kilohertz and the value of resistor 25 selected to provide a keying pulse at a repetition rate of one pulse per 100 milliseconds. If it is desired to detect a distance range of only zero to 15 feet while employing the full scale of meter 33, it is only necessary to change the value of resistor 25 thereby varying the repetition rate of the keying pulse. The meter may have a number of scales thereon for full scale readings of the different ranges. Since, as previously indicated, the transmitted power in each pulse is not affected by the change in range, the overall sensitivity of the instrument remains constant.

What is claimed is:

1. A depth sounder of the echo pulse ranging type comprising a transducer, oscillator means connected to said transducer to supply electrical energy thereto for conversion into source energy which is converted into an electrical signal by said transducer upon reflection, clock means for producing periodic timing signals, switching means connected to said clock means and to said oscillator means and for producing keying signals in response to said timing signals, said switching means preventing signal feedback from said oscillator means to said clock means, said oscillator being keyed into operation to produce pulses at a first rate in response to said keying signals, means responsive to a keying signal produced by said switching means to initiate a time measuring interval, means for receiving the electrical signal produced by reflected sonic energy, means responsive to said electrical signal for terminating the time measuring interval, and means responsive to the time interval measured for indicating the depth from which the sonic energy was reflected.

2. A depth sounder as in claim 1 further comprising means for selectively changing the rate of production of said timing signals produced by said clock means.

3. A depth sounder as in claim 2 wherein said oscillator means produces substantially the same amplitude pulse level of electrical energy in response to keying signals of different rates.

4. A depth sounder as in claim 1 wherein said clock means comprises a free-running asymmetrical type multivibrator.

5. A depth sounder as in claim 1 wherein said means for measuring the time interval comprises a flip-flop circuit means which is set to a first state in response to the commencement of a said keying signal and to a second state in response to the electrical signal for terminating said time measuring interval.

6. A depth sounder as in claim 5 wherein the depth indicating means comprises a current responsive meter, and means connecting said meter to said flip-flop circuit means to receive current during the time measuring interval.

7. A depth sounder as in claim 6 wherein said clock means comprises a free-running asymmetrical type multivibrator.

8. A depth sounder as in claim 5 further comprising means for selectively changing the rate of production of said timing signals.

9. A depth sounder as in claim 8 wherein said oscillator means produces substantially the same amplitude pulse level of electrical energy in response to keying signals of different rates.

10. A depth sounder as in claim 5 wherein said receiving means further comprises means for preventing the transmitted pulse from affecting the state of the flip-flop circuit.

11. A depth sounder as in claim 1 wherein said receiver means includes means to limit the amplitude of the electrical signal.

12. A depth sounder as in claim 1 wherein said switching means comprises transistor means, said transistor means becoming conductive in response to said timing signals and non-conductive in the absence of said timing signals.

13. A depth sounder as in claim 12 further comprising an RF choke between said oscillator means and said switching means.

* * * * *